United States Patent
Williams

(10) Patent No.: US 11,536,581 B2
(45) Date of Patent: Dec. 27, 2022

(54) METHODS AND SYSTEMS FOR DETERMINING A USAGE PREFERENCE OF A VEHICLE OPERATOR

(71) Applicant: Toyota Motor Engineering & Manufacturing North America, Inc., Plano, TX (US)

(72) Inventor: Clinton Williams, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 453 days.

(21) Appl. No.: 16/599,557

(22) Filed: Oct. 11, 2019

(65) Prior Publication Data

US 2021/0108938 A1 Apr. 15, 2021

(51) Int. Cl.
| | |
|---|---|
| *G01C 21/34* | (2006.01) |
| *H04W 4/80* | (2018.01) |
| *G05D 1/00* | (2006.01) |
| *G01C 21/36* | (2006.01) |

(52) U.S. Cl.
CPC ..... *G01C 21/3484* (2013.01); *G01C 21/3617* (2013.01); *G05D 1/0022* (2013.01); *H04W 4/80* (2018.02)

(58) Field of Classification Search
CPC . G01C 21/3484; G01C 21/3617; H04W 4/80; G05D 1/0022
See application file for complete search history.

(56) References Cited

U.S. PATENT DOCUMENTS

| | | | | |
|---|---|---|---|---|
| 9,229,623 B1* | 1/2016 | Penilla | ............... | G06F 3/04842 |
| | | | | 345/1.1 |
| 9,363,647 B2* | 6/2016 | Kim | ..................... | H04W 4/046 |
| 9,508,199 B2 | 11/2016 | Bai et al. | | |
| 9,979,813 B2 | 5/2018 | Pandurangarao | | |
| 10,104,564 B1* | 10/2018 | Cimino | ................ | H04W 24/08 |

(Continued)

FOREIGN PATENT DOCUMENTS

CN 105511945 A 4/2016

OTHER PUBLICATIONS

Iyer, V. et al., "Living IoT: A flying wireless platform on live insects", MobiCom '19, The 25th Annual International Conference on Mobile Computing and Networking, Article No. 5, Oct. 21-25, 2019, Los Cabos, Mexico.

*Primary Examiner* — Anne Marie Antonucci
*Assistant Examiner* — Patrick M Brady
(74) *Attorney, Agent, or Firm* — Dinsmore & Shohl LLP

(57) ABSTRACT

An embodiment takes the form of a system that obtains application-usage data from a personal mobile device of a vehicle operator of a vehicle. The application-usage data reflects a usage, during operation of the vehicle, of an application on the personal mobile device. The system identifies a vehicle feature, of the vehicle, that provides a vehicle functionality similar to an application functionality provided by the application on the personal mobile device, and performs a comparison of the obtained application-usage data with feature-usage data. The feature-usage data reflects a usage, during operation of the vehicle, of the identified vehicle feature. The system determines, based on the comparison, a usage preference for the application during operation of the vehicle over the identified vehicle feature.

20 Claims, 5 Drawing Sheets

(56) References Cited

U.S. PATENT DOCUMENTS

| | | | |
|---|---|---|---|
| 10,251,034 B2* | 4/2019 | Langlois | H04L 67/148 |
| 10,718,627 B2* | 7/2020 | Vulcano | G01C 21/3617 |
| 2010/0037057 A1* | 2/2010 | Shim | G06F 21/606 |
| | | | 713/171 |
| 2013/0006724 A1* | 1/2013 | Simanek | G06Q 30/0251 |
| | | | 705/13 |
| 2014/0129612 A1* | 5/2014 | Hamilton | H04L 67/025 |
| | | | 709/202 |
| 2014/0179274 A1* | 6/2014 | O'Meara | H04L 67/12 |
| | | | 709/204 |
| 2014/0280552 A1* | 9/2014 | Ng | G06F 3/1423 |
| | | | 345/1.1 |
| 2015/0002370 A1* | 1/2015 | Fernahl | H04B 1/38 |
| | | | 455/414.1 |
| 2015/0195669 A1* | 7/2015 | Grover | G06Q 30/0201 |
| | | | 705/7.31 |
| 2015/0262198 A1* | 9/2015 | Bai | G08G 1/096725 |
| | | | 701/31.5 |
| 2016/0034238 A1* | 2/2016 | Gerlach | B60K 35/00 |
| | | | 701/36 |
| 2016/0144714 A1* | 5/2016 | Kim | B60K 37/06 |
| | | | 701/1 |
| 2017/0174157 A1* | 6/2017 | Deljevic | B60L 58/12 |
| 2018/0070290 A1* | 3/2018 | Breaux | H04M 1/72463 |
| 2018/0154865 A1 | 6/2018 | Bianchi, III et al. | |
| 2019/0073412 A1* | 3/2019 | Ranganathan | G06F 16/9035 |
| 2019/0265884 A1* | 8/2019 | Penilla | B60L 53/80 |

* cited by examiner

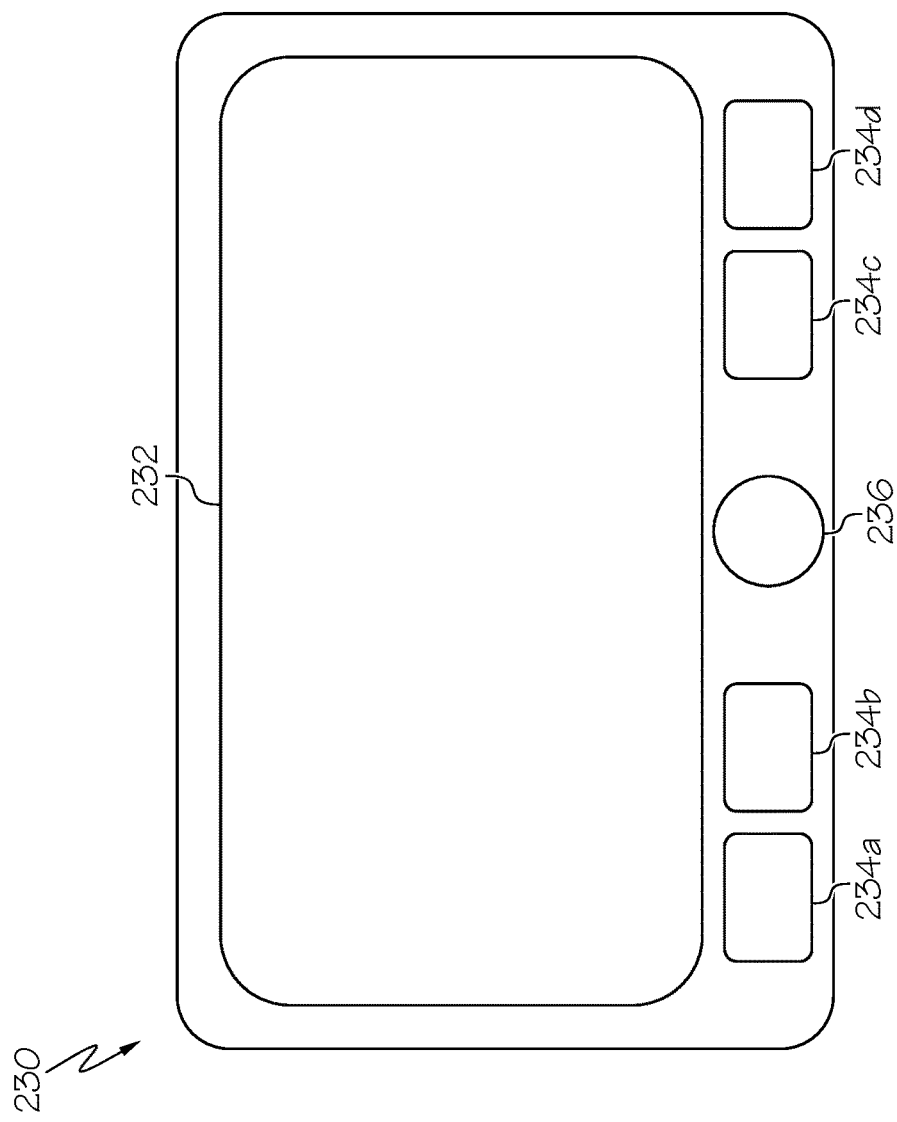
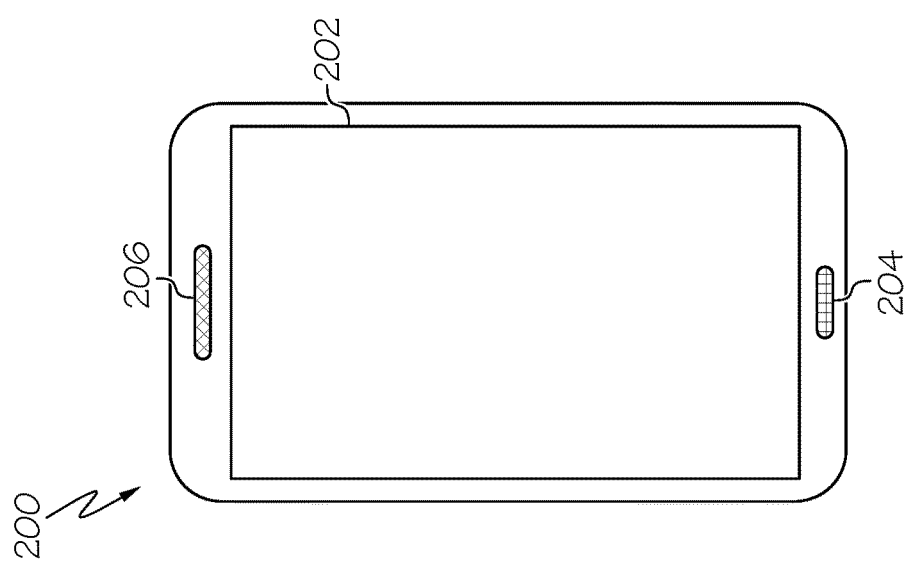
FIG. 2B
FIG. 2A

| APP ID (512) | APP FUNCTIONALITY (514) |
|---|---|
| "MAP APP 1" (502) | MAPPING AND NAVIGATION |
| "MAP APP 2" (504) | MAPPING AND NAVIGATION |
| "AUDIO APP 1" (506) | MUSIC |
| "AUDIO APP 2" (508) | MUSIC |
| "AUDIO APP 2" (510) | PODCASTS |

FIG. 5A

| VEHICLE FUNCTIONALITY (564) | VEHICLE FEATURE ID (562) |
|---|---|
| MAPPING AND NAVIGATION (552) | "IN-VEHICLE NAVIGATION" |
| MUSIC (554) | "MEDIA CENTER" |
| PODCASTS (556) | "MEDIA CENTER" |

FIG. 5B

METHODS AND SYSTEMS FOR DETERMINING A USAGE PREFERENCE OF A VEHICLE OPERATOR

TECHNICAL FIELD

The present disclosure generally relates to vehicle systems, computing devices, and methods carried out by the systems and devices, and more specifically, to methods, systems, and devices for determining a usage preference for an application on a personal mobile device over a vehicle feature of a vehicle.

BACKGROUND

Vehicles may be equipped with hardware and software that provide drivers or other vehicle occupants with a rich user experience. For instance, a vehicle may include a touchscreen display and software applications that can be operated via the touchscreen display. These software applications may assist with vehicle navigation, provide weather conditions or other information to the driver, or allow for playback of podcasts or other media, as examples.

SUMMARY

An embodiment of the present disclosure takes the form of a method that includes obtaining application-usage data from a personal mobile device of a vehicle operator of a vehicle. The application-usage data reflects a usage, during operation of the vehicle, of an application on the personal mobile device. The method further includes identifying a vehicle feature, of the vehicle, that provides a vehicle functionality similar to an application functionality provided by the application on the personal mobile device, and performing a comparison of the obtained application-usage data with feature-usage data. The feature-usage data reflects a usage, during operation of the vehicle, of the identified vehicle feature. The method also includes determining, based on the comparison, a usage preference for the application during operation of the vehicle over the identified vehicle feature.

Another embodiment takes the form of a computing device that includes a processor and a non-transitory computer-readable storage medium that includes instructions. The instructions, when executed by the processor, cause the computing device to obtain application-usage data from a personal mobile device of a vehicle operator of a vehicle. The application-usage data reflects a usage, during operation of the vehicle, of an application on the personal mobile device. The instructions further cause the computing device to identify a vehicle feature, of the vehicle, that provides a vehicle functionality similar to an application functionality provided by the application on the personal mobile device, and perform a comparison of the obtained application-usage data with feature-usage data. The feature-usage data reflects a usage, during operation of the vehicle, of the identified vehicle feature. The instructions also cause the computing device to determine, based on the comparison, a usage preference for the application during operation of the vehicle over the identified vehicle feature.

A further embodiment takes the form of a method that includes obtaining application-usage data from a personal mobile device of a vehicle operator of a vehicle. The application-usage data reflects a usage, during operation of the vehicle, of a mobile-device application executed by the personal mobile device. The method further includes identifying a vehicle application, executed by the vehicle, that provides a vehicle functionality similar to an application functionality provided by the mobile-device application executed by personal mobile device, and performing a comparison of the obtained application-usage data with feature-usage data. The feature-usage data reflects a usage, during operation of the vehicle, of the identified vehicle application. The method also includes determining, based on the comparison, a usage preference for the mobile-device application during operation of the vehicle over the identified vehicle application.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 2a depicts a user interface device of a personal mobile device, according to one or more embodiments described and illustrated herein;

FIG. 2b depicts a user interface device of a vehicle, according to one or more embodiments described and illustrated herein;

FIG. 5a depicts a database of applications of personal mobile devices, according to one or more embodiments described and illustrated herein; and FIG. 5b depicts a manifest of vehicle features of a vehicle, according to one or more embodiments described and illustrated herein.

DETAILED DESCRIPTION

Vehicle systems, computing devices, and methods for determining a usage preference for an application on a personal mobile device over a vehicle feature of a vehicle are disclosed herein. In some embodiments, a system obtains application-usage data from a personal mobile device of a vehicle operator of a vehicle. The application-usage data reflects a usage, during operation of the vehicle, of an application on the personal mobile device. The system identifies a vehicle feature, of the vehicle, that provides a vehicle functionality similar to an application functionality provided by the application on the personal mobile device, and performs a comparison of the obtained application-usage data with feature-usage data. The feature-usage data reflects a usage, during operation of the vehicle, of the identified vehicle feature. The system determines, based on the comparison, a usage preference for the application during operation of the vehicle over the identified vehicle feature. By determining such usage preferences of vehicle operators, it may be possible to identify vehicle features providing functionality that vehicle operators instead prefer to obtain from applications on personal mobile devices.

These identified vehicle features may be removed from vehicles, and subsequently-produced vehicles may be delivered without the identified vehicle features, which may potentially reduce the amount of resources required to produce or operate the vehicles and possibly reduce the costs of the vehicles. Various embodiments of vehicle systems, computing devices, and methods for determining a usage preference for an application over a vehicle feature will now be described in detail with reference to the drawings.

Figure 1:
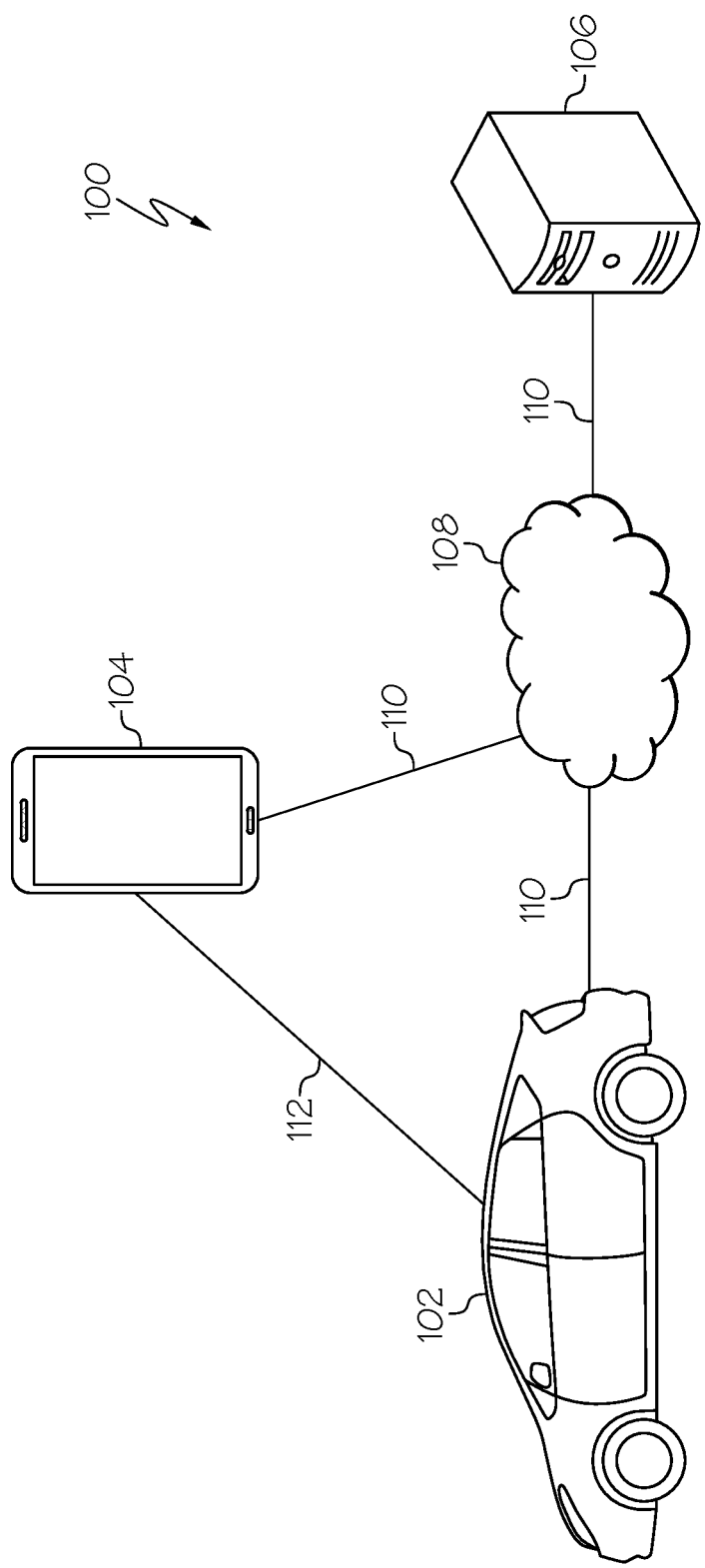
FIG. 1 depicts a vehicle system, according to one or more embodiments described and illustrated herein.

FIG. 1 depicts a vehicle system, according to one or more embodiments described and illustrated herein. As shown, a system 100 includes a vehicle 102, a personal mobile device 104, and a server computer 106, each of which are communicatively connected via a network 108 and respective communication links 110 to the network. Additionally, vehicle 102 is communicatively connected to personal mobile device 104 via a local communication link 112. Any of vehicle 102, personal mobile device 104, or server computer 106, or any combination of these, may be configured to carry out the vehicle-system functions described herein.

Vehicle 102 could take the form of an autonomous vehicle, a semi-autonomous vehicle, or a manually-operated vehicle, among other possibilities. The vehicle may include a user interface device, and could include a computing device configured to carry out the vehicle functions and/or vehicle-system functions described herein. Additional aspects of vehicle 102 are described throughout the specification.

Personal mobile device 104 could include a smartphone, a mobile phone, a tablet computer, a wearable computer, a smartwatch, a head-mounted display, a mobile computing device, or any other personal mobile device configured to carry out the personal-mobile-device functions and/or vehicle-system functions described herein. Personal mobile device 104 may be used by a vehicle operator of vehicle 102, though it should be understood that the vehicle operator of vehicle 102 is not limited to a driver of the vehicle. For instance, the vehicle operator could include a passenger of the vehicle, a driver of the vehicle, or a combination of these, as examples.

Server computer 106 could take the form of a mainframe, a workstation, a terminal, a personal computer, a virtual machine, or any combination of these or other server computers. The server computer could include a computing device configured to carry out the server-computer functions and/or the vehicle-system functions described herein. Though system 100 is shown as including a single server computer, those of skill in the art will appreciate that the system could include multiple server computers.

Network 108 may include one or more computing systems and network infrastructure configured to facilitate communication between any one or more of vehicle 102, personal mobile device 104, and server computer 106. The network may take the form of (or include) one or more Wide-Area Networks (WANs), Local-Area Networks (LANs), the Internet, cellular networks, wired networks, wireless networks, or any combination of these or other networks. Network 108 may operate according to one or more communication protocols such as Ethernet, Wi-Fi, IP, TCP, or LTE, as examples. Though network 108 is shown as a single network, it should be understood that the network may include multiple, distinct networks that are communicatively linked. Network 108 could take other forms as well.

Communication links 110 may communicatively connect vehicle 102, personal mobile device 104, and/or server computer 106 to network 108 to facilitate communication between these or other entities communicatively connected to the network. Any of communication links 110 could include wired and/or wireless communication links, and could include a combination of hardware and/or software, perhaps operating on one or more communication-link layers such as one or more physical, network, transport, and/or application layers. Communication links 110 may include one or more intermediate paths or systems, for example.

Local communication link 112 may facilitate communication between vehicle 102 and personal mobile device 104, and could include a wired and/or wireless link. In an embodiment, local communication link 112 facilitates direct communication between the vehicle and the personal mobile device, and the local communication link does not include any intermediate systems, networks, or paths except for those that may be part of the vehicle or the personal mobile device. The local communication link may facilitate communication via a short-range communication protocol, which may include wireless protocols such as Bluetooth, Wi-Fi, near-field communication (NFC), ZigBee, or Z-Wave (as examples), wired protocols such as Universal Serial Bus (USB) or IEEE 1394 (FireWire) (among other possibilities), or a combination of these. It should be understood that local communication link 112 could take other forms as well, including a form similar to any of communication links 110.

Those of skill in the art will appreciate that system 100 may include different and/or additional entities, and will appreciate that the functions of system 100 (including the functions of vehicle 102, personal mobile device 104, and/or server computer 106) may be carried out by any combination of entities of system 100. As an example, system 100 could include additional personal mobile devices, and may not include server computer 106. Further, one or more of communication links 110 may be absent, such as the communication link between personal mobile device 104 and network 108. As another example, local communication link 112 may be absent. Other variations are possible as well.

FIG. 2a depicts a user interface device of personal mobile device 104, according to one or more embodiments described and illustrated herein. As shown, a user interface device 200 of the personal mobile device includes a display device 202, a microphone 204, and a speaker 206. Personal mobile device 104 may receive input (e.g., from a vehicle operator of vehicle 102), and/or provide output (e.g., to the vehicle operator), via user interface device 200 using one or more of the display device, the microphone, and the speaker. For instance, input may be received by personal mobile device 104 via display device 202, microphone 204, and/or another input component of user interface device 200. Additionally, output may be provided by the personal mobile device via display device 202, speaker 206, another output component of user interface device 200, or a combination of these. Some components of user interface device 200 may facilitate both input and output—for instance, display device 202 could take the form of a touchscreen display device, and personal mobile device 104 may provide output and receive input via the touchscreen display device. It should be understood that user interface device 200 may take the form of multiple user interface devices, and may include different and/or additional components.

FIG. 2b depicts a user interface device of vehicle 102, according to one or more embodiments described and illustrated herein. As shown, a user interface device 230 of vehicle 102 includes display device 232 (e.g., a touchscreen display device), push buttons 234a, 234b, 234c, and 234d, and control knob 236. Vehicle 102 may receive input from a vehicle operator of the vehicle, and/or provide output to the vehicle operator, via user interface device 230 using one or more of the display device, the push buttons, and the control knob. For instance, input may be received by vehicle 102 via display device 232, push buttons 234a-234d, control knob 236, a microphone of user interface device 230, and/or another input component of the user interface device. Additionally, output may be provided by the vehicle via display device 232 and/or another component of user interface device 230, such as a speaker of the user interface device. It should be understood that user interface device 230 need not take the form of a single, discrete device, but could instead take the form of multiple user interface devices. For instance, the user interface device could include a first user interface device in the form of an automotive head unit that includes display device 232, push buttons 234a-234d, and control knob 236, and a second user interface device that includes a microphone and a speaker installed in an interior of vehicle 102. Additionally, user interface device 230 may include different and/or additional components.

Figure 3:
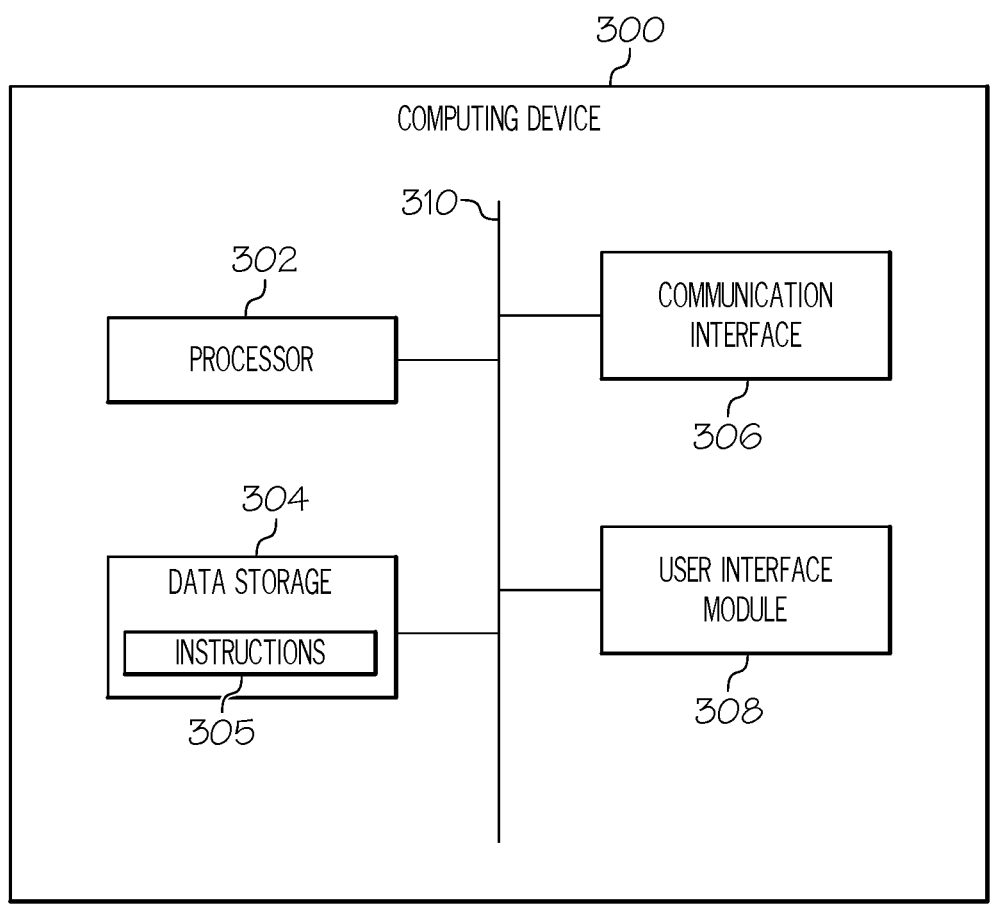
FIG. 3 depicts a block diagram of a computing device, according to one or more embodiments described and illustrated herein.

FIG. 3 depicts a block diagram of a computing device, according to one or more embodiments described and illustrated herein. As shown, a computing device 300 includes a processor 302, a data storage 304 including instructions 305, a communication interface 306, and a user interface module 308, each of which are communicatively connected via a system bus 310. Vehicle 102, personal mobile device 104, server computer 106, any other entity of system 100, or any combination of these could take the form of (or include) computing device 300.

Processor 302 may take the form of one or more general-purpose processors and/or one or more special-purpose processors, and may be integrated in whole or in part with data storage 304, communication interface 306, user interface module 308, and/or any other component of computing device 300, as examples. Accordingly, processor 302 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 304 may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database management system (RDBMS), any other non-volatile storage, or any combination of these, to name just a few examples.

Instructions 305 may be stored in data storage 304, and may include machine-language instructions executable by processor 302 to cause computing device 300 to perform the computing-device functions and/or vehicle-system functions described herein. Additionally or alternatively, instructions 305 may include script instructions executable by a script interpreter configured to cause processor 302 and computing device 300 to execute the instructions specified in the script instructions. It should be understood that instructions 305 may take other forms as well.

Additional data may be stored in data storage 304, such as a database of applications of personal mobile devices and/or a manifest of vehicle features of one or more vehicles, as will be described in further detail below. The additional data could be stored as a table, a flat file, data in a file system of the data storage, a heap file, a B+ tree, a hash table, a hash bucket, or any combination of these, as examples.

Communication interface 306 may be any component capable of performing the communication-interface functions described herein, including facilitating wired and/or wireless communication between computing device 300 and another entity (such as an entity of system 100). As such, communication interface 306 could take the form of a Bluetooth, Wi-Fi, USB, and/or LTE interface, among many other examples. Communication interface 306 may receive data over network 108 via one or more of communication links 110 and local communication link 112, for instance.

User interface module 308 may be any component capable of carrying out the user-interface-module functions described herein. For example, the user interface module may include user interface device 200 of personal mobile device 104, user interface device 230 of vehicle 102, or another user interface device, and could further include other hardware and/or software for realizing input and/or output via the user interface device.

System bus 310 may be any component capable of performing the system-bus functions described herein. In an embodiment, system bus 310 is any component configured to transfer data between processor 302, data storage 304, communication interface 306, user interface module 308, and/or any other component of computing device 300. In an embodiment, system bus 310 includes a traditional bus as is known in the art. In other embodiments, system bus 310 includes a serial RS-232 communication link, a USB communication link, and/or an Ethernet communication link, alone or in combination with a traditional computer bus, among numerous other possibilities. In some examples, system bus 310 may be formed from any medium that is capable of transmitting a signal, such as conductive wires, conductive traces, or optical waveguides, among other possibilities. Moreover, system bus 310 may be formed from a combination of mediums capable of transmitting signals. The system bus could take the form of (or include) a vehicle bus, such as a local interconnect network (LIN) bus, a controller area network (CAN) bus, a vehicle area network (VAN) bus, or any combination of these or mediums. System bus 310 may take various other forms as well.

It should be understood that computing device 300 may include different and/or additional components, and some or all of the functions of a given component could instead be carried out by one or more different components. Additionally, computing device 300 could take the form of (or include) multiple computing devices, and some or all of the functions of a given component could be carried out by any combination of one or more of the computing devices.

Figure 4:
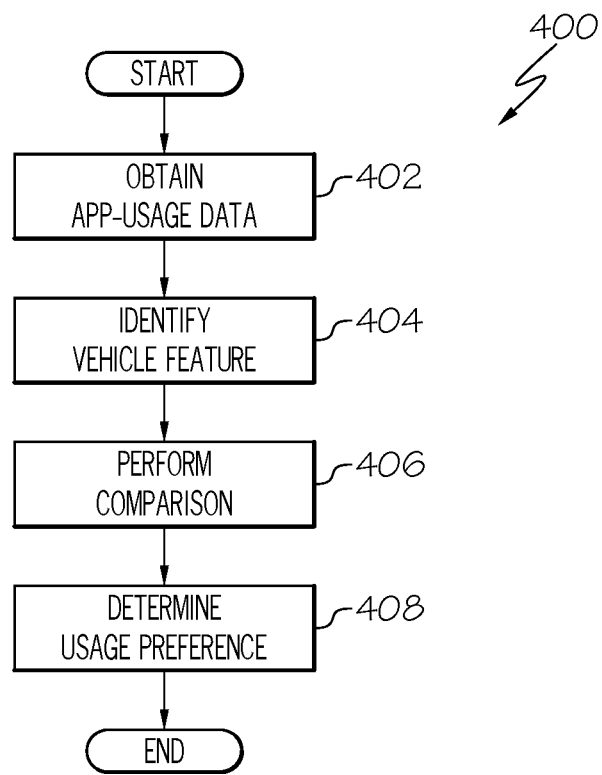
FIG. 4 depicts a flowchart of a method, according to one or more embodiments described and illustrated herein.

FIG. 4 depicts a flowchart of a method carried out by a vehicle system, according to one or more embodiments described and illustrated herein. As shown, a method 400 begins at step 402 with system 100 obtaining application-usage data from personal mobile device 104 of a vehicle operator of vehicle 102.

The application could be a computer program or software application executed by personal mobile device 104. The application may provide application functionality such as mapping and navigation, media playback (including playback of audio, video, music, and/or podcasts), text messaging (e.g., SMS), telephony, and/or data tethering, among other possibilities. In an example, the application includes application instructions stored on a data storage of personal mobile device 104 (such as data storage 304 of the personal mobile device). The application instructions, when executed by a processor of the personal mobile device, cause the personal mobile device to provide the functionality of the application.

The application-usage data reflects a usage of an application on personal mobile device 104 during operation of vehicle 102. For instance, the application-usage data may reflect usage of the application by the vehicle operator of the vehicle—such as a driver of the vehicle and/or a passenger of the vehicle, among other examples. The application-usage data may reflect usage of the application via user interface device 200 of personal mobile device 104—for instance, via display device 202, microphone 204, and speaker 206. Display device 202 could include a touchscreen display, and usage of the application via display device 202 could include a tapping, pressing, or swiping of the vehicle operator's fingers on the touchscreen display. As a further possibility, usage of the application could include words or utterances spoken to (e.g., received by) microphone 204 by the vehicle operator. Additionally, usage of the application could include a display presented by display device 202 to the vehicle operator, and/or audio generated for the vehicle operator by speaker 206. For instance, if the vehicle operator is navigating to a given destination and the application provides navigation functionality, then the display could include display of a map or a list of turn-by-turn directions on display device 202.

In an embodiment, personal mobile device 104 includes an operating system (e.g., an operating system executed by the personal mobile device). The operating system could include operating-system instructions that are stored on a data storage of the personal mobile device and that, when executed by a processor of the personal mobile device, cause the personal mobile device to execute the operating system. For instance, usage of the application could include usage detected by the operating system while the application is in a foreground of a shell of the operating system. In such a case, the application-usage data could include application-usage data (e.g., logs files, a screenshot of display device 202 of personal mobile device 104) that is generated by the operating system and that reflects the usage detected by the operating system while the application is in the foreground of the shell. As another example, usage of the application could include usage detected by the application based on data received by the application from the operating system. For example, usage of the application could include usage while the application is in a foreground of a shell of an operating system of the personal mobile device, and/or while the application is in a background of the operating system (e.g., while the application is executed as a background process by the operating system). In such a case, the application-usage data could include application-usage data (e.g., log files, a screenshot of display device 202, and/or a screenshot of the application as captured by the app) that is generated by the application and that reflects usage of the application (as detected by the app).

The application-usage data reflecting usage of the application may include data reflecting an amount of time that the application was displayed by personal mobile device 104 via display device 202 of the personal mobile device, and/or a number of times that the application was displayed by the personal mobile device via display device 202. As another possibility, the application-usage data reflecting usage of the application may include an amount of time that the vehicle operator interacted with the application, and/or a number of times that the vehicle operator interacted with the application. As a further possibility, the application-usage data reflecting usage of the application may include a number of times that the application was launched on personal mobile device 104 by the vehicle operator (e.g., via an operating system of the mobile device), and/or a number of times that the application was brought to a foreground of a shell of an operating system of the personal mobile device. It should be understood that the application-usage data may include data reflecting any combination of these or other usage of the application.

In some cases, the application-usage data may reflect usage of the application on personal mobile device 104 via user interface device 230 of vehicle 102. For instance, vehicle 102 may establish a remote-interface connection with personal mobile device 104 via local communication link 112. Subsequent to establishing the connection, the personal mobile device may provide output to the vehicle operator by causing the vehicle to provide the output via user interface device 230 (e.g., via display device 232) of vehicle 102. As an example, if the vehicle operator is navigating to a given destination and the application provides navigation functionality, then usage of the application could include a display, presented by display device 232 of vehicle 102, of a map or a list of turn-by-turn directions. Additionally, the personal mobile device may receive input from a vehicle operator of the vehicle by causing the vehicle to receive the input via user interface device 230 (e.g., via display device 232, push buttons 234a-234d, and/or control knob 236) of vehicle 102, which may then be received by the personal mobile device. Other examples are possible as well.

Operation of vehicle 102 may include an ignition-on cycle of the vehicle, and usage of the application during operation of the vehicle could include usage of the application during the ignition-on cycle. An ignition-on cycle could begin at an ignition-on of vehicle 102, for instance, and could end at an ignition-off of the vehicle, among other examples. As another possibility, operation of vehicle 102 may include an accessory power-on cycle of the vehicle, and usage of the application during operation of the vehicle could include usage of the application during the accessory power-on cycle. An accessory power-on cycle could begin at an accessory power-on of vehicle 102, for example, and could end at an accessory power-off of the vehicle. Other examples of operation of vehicle 102 as possible as well, as are examples of usage of the application during operation of the vehicle.

Obtaining the application-usage data from personal mobile device 104 may include vehicle 102 obtaining the application-usage data from the personal mobile device via (wired and/or wireless) local communication link 112. Obtaining the application-usage data from the personal mobile device via local communication link 112 could include establishing a remote-interface connection with personal mobile device 104 via local communication link 112 (as discussed above), and obtaining the application-usage data from the personal mobile device over the remote-interface connection via local communication link 112.

As another possibility, obtaining the application-usage data from personal mobile device 104 could include server computer 106 obtaining the application-usage data from the personal mobile device over network 108 via respective communication links 110 (e.g., LTE communication links) between the server computer and the network and between the network and the personal mobile device. As a further possibility, obtaining the application-usage data could include vehicle 102 obtaining the application-usage data from personal mobile device 104 over network 108 via respective communication links 110 (e.g., LTE communication links) between the vehicle and the network and between the network and the personal mobile device. It should be understood that obtaining the application-usage data from personal mobile device 104 may take other forms as well.

At step 404, system 100 identifies a vehicle feature, of vehicle 102, that provides a vehicle functionality similar to an application functionality provided by the application on personal mobile device 104. For instance, system 100 may identify a vehicle application, executed by vehicle 102, that provides a vehicle functionality similar to an application functionality provided by the mobile-device application executed by personal mobile device 104.

The vehicle feature could be a computer program or software application executed by vehicle 102. The vehicle feature may provide vehicle functionality such as mapping, navigation, media playback (including playback of audio, video, music, and/or podcasts), text messaging (e.g., SMS), telephony, and/or data tethering, among other possibilities. In an example, the vehicle features takes the form of (or includes) vehicle-feature instructions stored on a data storage of vehicle 102 (such as data storage 304 of the vehicle). The vehicle-feature instructions, when executed by a processor of the vehicle, cause the vehicle to provide the functionality of the vehicle feature. As another possibility, the vehicle feature could take the form of an electronic control unit (ECU). Other examples are possible as well.

In an embodiment, identifying the vehicle feature of vehicle 102 that provides the vehicle functionality similar to the application functionality includes determining the application functionality and identifying, from a manifest of respective vehicle functionalities provided by one or more vehicle features, a vehicle functionality similar to the determined application.

In an embodiment identifying the vehicle feature of vehicle 102 that provides the vehicle functionality similar to the application functionality includes determining the application functionality and identifying, from among respective vehicle functionalities provided by one or more vehicle features, a vehicle functionality similar to the determined application functionality. In such an embodiment, identifying the vehicle features includes obtaining a feature identification of the vehicle feature that provides the identified vehicle functionality. Several examples of identifying the vehicle feature are provided below with reference to FIGS. 5a and 5b.

FIG. 5a depicts a database of applications of personal mobile devices, and FIG. 5b depicts a manifest of vehicle features of a vehicle, according to one or more embodiments described and illustrated herein. As shown in FIG. 5a, a database 500 of applications of personal mobile devices includes applications 502, 504, 506, 508, and 510. For each application, the database includes a respective application ID 512 and a respective application functionality indication 514. As shown in FIG. 5b, a manifest 550 of vehicle features of vehicle 102 includes vehicle features 552, 554, and 556. For each vehicle feature, the manifest includes a respective vehicle feature ID 562 and a respective vehicle functionality indication 564.

With reference to FIG. 5a, determining the application functionality may include obtaining an application ID 512 of the application on personal mobile device 104. For instance, the application could have been downloaded from an application repository (such as an application marketplace), which may have assigned the application with an application ID unique to the application. Subsequent to downloading the application, the personal mobile device may have installed the application and concurrently saved the unique application ID for the application to a data storage of the personal mobile device. In such a case, obtaining the application ID may involve obtaining the application ID from the data storage. Determining the application functionality may then include identifying an application, from among database 500 of applications, having the same application ID as that obtained from the data storage. For instance, the application ID of the application on personal mobile device 104 could be "Audio App 2", and identifying an application, from among database 500 of applications having the same application ID as the application ID obtained from the data storage may include identifying application 508, which also has an application ID of "Audio App 2".

Determining the application functionality may include determining the application functionality based on an obtained application ID of the application on personal mobile device 104. For instance, with reference to FIG. 5a, determining the application functionality based on the obtained application ID of "Audio App 2" for the application on personal mobile device 104 (which is also the application ID of application 508 in database 500) may include retrieving the respective application functionality indication 514 of application 508 having the same application ID 512 as the obtained application ID. As shown in FIG. 5a, the respective application functionality indication 514 of application 508 is "Music".

Identifying the vehicle functionality similar to the determined application functionality may include identifying, from among manifest 550 of vehicle features, a vehicle functionality indication 564 that is the same as (and/or similar to) application functionality indication 514 of the application in database 500 (retrieved as described above) that has the same application ID 512 as the obtained application ID for the application on personal mobile device 104. For instance, with reference to FIG. 5b, identifying a vehicle functionality indication 564 that is the same as or similar to application functionality indication 514 may include identifying vehicle feature 554, which has a respective vehicle functionality indication 564 of "Music" that is the same as application functionality indication 514 of application 508 (as retrieved in the manner described above).

Obtaining the feature identification of the vehicle feature that provides the identified vehicle functionality may include retrieving respective vehicle feature ID 562 of the vehicle feature having respective vehicle functionality indication 564 (as identified in the manner discussed above) that is the same as (and/or similar to) application functionality indication 514 (as retrieved in the manner described above). For instance, with reference to FIG. 5b, retrieving respective vehicle feature ID 562 may include retrieving the respective vehicle feature ID of vehicle feature 554, which has respective vehicle functionality indication 564 that is the same as respective application functionality indication 514 of application 508 in database 500.

Referring back to FIG. 4, at step 406, system 100 performs a comparison of the application-usage data obtained at step 402 with feature-usage data. The feature-usage data reflects a usage, during operation of vehicle 102, of the vehicle feature identified at step 404. For example, system 100 may perform a comparison of the obtained application-usage data with feature-usage data that reflects a usage, during operation of vehicle 102, of the identified vehicle application. In some cases, the feature-usage data may reflect that the vehicle feature was not used during operation of the vehicle.

The usage of the identified vehicle feature may take a form similar to usage of the application on personal mobile device 104 as described above with reference to step 402, and the feature-usage data may take a form similar to the application-usage data obtained at step 402. For instance, the feature-usage data may reflect usage of the vehicle feature by the vehicle operator of the vehicle, such as a driver of the vehicle and/or a passenger of the vehicle, among other examples. The feature-usage data may reflect usage of the vehicle feature via user interface device 230 of vehicle 102—for instance, via display device 232, push buttons 234a-234d, and/or control knob 236. Display device 232 could include a touchscreen display, and usage of the vehicle feature via display device 232 could include a tapping, pressing, or swiping of the vehicle operator's fingers on the touchscreen display and/or a display presented by display device 232 to the vehicle operator. As a further possibility, usage of the vehicle feature could include words or utterances spoken to (e.g., received by) a microphone of user interface device 230 by the vehicle operator, and/or audio generated for the vehicle operator by a speaker of user interface device 230 of vehicle 102. For instance, the vehicle feature could include a podcast application executed by vehicle 102, and usage of the vehicle feature could include audio generated for playback of a podcast by the podcast application, or could include tapping of the vehicle operator's fingers on display device 232 (which could be a touchscreen display, for instance).

In an embodiment, vehicle 102 includes an operating system (e.g., an operating system executed by the vehicle). The operating system could include operating-system instructions that are stored on a data storage of the vehicle and that, when executed by a processor of the vehicle, cause the vehicle to execute the operating system. For instance, usage of the vehicle feature could include usage detected by the operating system while the vehicle feature is in a foreground of a shell of the operating system. In such a case, the feature-usage data could include feature-usage data (e.g., logs files, a screenshot of display device 232 of vehicle 102) that is generated by the operating system and that reflects the usage detected by the operating system while the vehicle feature is in the foreground of the shell. As another example, usage of the vehicle feature could include usage detected by the vehicle feature itself based on data received by the vehicle feature from the operating system. For example, usage of the vehicle feature could include usage while the vehicle feature is in a foreground of a shell of an operating system of the vehicle, and/or while the vehicle feature is in a background of the operating system (e.g., while the vehicle feature is executed as a background process by the operating system). In such a case, the feature-usage data could include feature-usage data (e.g., log files, a screenshot of display device 232, and/or a screenshot of the vehicle feature as captured by the vehicle feature) that is generated by the vehicle feature and that reflects usage of the vehicle feature (as detected by the vehicle feature).

The feature-usage data reflecting usage of the vehicle feature may include data reflecting an amount of time that the vehicle feature was displayed by vehicle 102 via display device 232 of the vehicle, and/or a number of times that the vehicle feature was displayed by the vehicle via display device 232. In such an example, performing the comparison of the application-usage data with feature-usage data could include comparing this amount of time and/or number of times, with an amount of time that the application on personal mobile device 104 was displayed by personal mobile device 104 via display device 202 of the personal mobile device and/or a number of times that the application was displayed by the personal mobile device via display device 202. As another possibility, the feature-usage data reflecting usage of the vehicle feature may include an amount of time that the vehicle operator interacted with the vehicle feature, and/or a number of times that the vehicle operator interacted with the vehicle feature. In such an example, performing the comparison of the application-usage data with feature-usage data could include comparing this amount of time and/or number of times, with an amount of time that the vehicle operator interacted with the application, and/or a number of times that the vehicle operator interacted with the application.

As a further possibility, the feature-usage data reflecting usage of the vehicle feature may include a number of times that the vehicle feature was launched on vehicle 102 by the vehicle operator (e.g., via an operating system of the mobile device), and/or a number of times that the vehicle feature was brought to a foreground of a shell of an operating system of the vehicle. In such a case, performing the comparison of the application-usage data with feature-usage data could include comparing either or both of these numbers of times with a number of times that the application was launched on personal mobile device 104 by the vehicle operator (e.g., via an operating system of the mobile device), and/or comparing either or both of these numbers with a number of times that the application was brought to a foreground of a shell of an operating system of the personal mobile device. It should be understood that the feature-usage data may include data reflecting any combination of these or other usage of the vehicle features.

At step 408, system 100 determines, based on the comparison performed at step 406, a usage preference for the application during operation of vehicle 102 over the vehicle feature identified at step 404. For example, system 100 may determine, based on the comparison, a usage preference for the application during operation of the vehicle over a vehicle application (e.g., a software application executed by the vehicle) identified at step 404. The usage preference may reflect a preference of the vehicle operator to use the application over the vehicle feature, and may reflect a preference to utilize application functionality provided by the application over similar functionality provided by the vehicle feature.

Determining the usage preference could include generating a report based on the determined usage preference. The report could indicate the usage preference, and could include some or all of the application-usage data and/or the feature-usage data. In some cases, method 400 may be performed for each of a plurality of vehicle operators, and the generated report could indicate respective usage preferences for each of the vehicle operators (and/or an aggregate usage preference). For instance, system 100 (e.g., server computer 106) could obtain application-usage data from respective personal mobile devices of each of the vehicle operators, and identify a vehicle functionality that provides functionality similar to respective application functionality provided by respective applications on the personal mobile devices. The system could perform a comparison of the obtained application-usage data with feature-usage data that reflects usage of the identified vehicle feature, and based on the comparison, could determine respective usage preferences (and/or an aggregate usage preference) for the applications over the identified vehicle feature. The generated report (whether generated for a given vehicle operator or for multiple vehicle operators) could then be presented via a user interface—e.g., to a user via a user interface. For instance, the generated report could be presented via user interface device 230 of vehicle 102, and/or could be presented via a user interface of server computer 106. As another possibility, the report could be generated by server computer 106 and presented by the server computer via a user interface of a different entity of system 100—the different entity receives the report from server computer 106 and presents the received report via a user interface of the entity. Other examples are possible as well.

Determining the usage preference could include removing, from vehicle 102, the vehicle feature (identified at step 404) in response to determining the usage preference. For instance, the vehicle feature could include a vehicle application (e.g., a software application) executed by the vehicle. Vehicle 102 could determine the usage preference and responsively uninstall the vehicle application from the vehicle. Additionally or alternatively, personal mobile device 104 and/or server computer 106 may determine the usage preference, and in response to determining the usage preference, may send an instruction to vehicle 102 to uninstall the application. Upon receiving the instructions, the vehicle could then uninstall the application. The instruction could be sent to vehicle 102 over network 108 and communication links 110, and/or could be sent to the vehicle via local communication link 112. It should be understood that determining the usage preference could take numerous other forms as well.

It should now be understood that embodiments described herein are directed to vehicle systems, computing devices, and methods for determining a usage preference for an application on a personal mobile device over a vehicle feature of a vehicle. In some embodiments, a system obtains application-usage data from a personal mobile device of a vehicle operator of a vehicle. The application-usage data reflects a usage, during operation of the vehicle, of an application on the personal mobile device. The system identifies a vehicle feature, of the vehicle, that provides a vehicle functionality similar to an application functionality provided by the application on the personal mobile device, and performs a comparison of the obtained application-usage data with feature-usage data. The feature-usage data reflects a usage, during operation of the vehicle, of the identified vehicle feature. The system determines, based on the comparison, a usage preference for the application during operation of the vehicle over the identified vehicle feature.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
obtaining application-usage data from a personal mobile device of a vehicle operator of a vehicle, the application-usage data reflecting a usage, during operation of the vehicle, of an application on the personal mobile device;
identifying a vehicle feature, of the vehicle, that provides a vehicle functionality similar to an application functionality provided by the application on the personal mobile device;
performing a comparison of the obtained application-usage data with feature-usage data, the feature-usage data reflecting a usage, during operation of the vehicle, of the identified vehicle feature;
determining, based on the comparison, a usage preference for using the application on the personal mobile device, during operation of the vehicle, over the identified vehicle feature, wherein the identified vehicle feature is implemented by a vehicle application installed on and executed by the vehicle to enable the vehicle functionality similar to the application functionality provided by the application on the personal mobile device; and
in response to determining that the usage preference is a preference for using the application on the personal mobile device over the identified vehicle feature, causing the vehicle to automatically uninstall the vehicle application installed on a memory component of the vehicle such that the vehicle application is removed from the memory component of the vehicle.

2. The method of claim 1, wherein operation of the vehicle comprises at least one of an ignition-on cycle of the vehicle and an accessory power-on cycle of the vehicle.

3. The method of claim 1, wherein the usage of the application on the personal mobile device during operation of the vehicle comprises at least one of:
a tapping, pressing, or swiping of fingers of the vehicle operator on a touchscreen display of the personal mobile device,
words or utterances spoken to a microphone of the personal mobile device by the vehicle operator,
a display presented to the vehicle operator by a display device of the personal mobile device, and
audio generated for the vehicle operator by a speaker of the personal mobile device.

4. The method of claim 1, wherein the usage of the application on the personal mobile device during operation of the vehicle comprises at least one of usage of the application via a user interface device of the personal mobile device and usage of the application via a user interface device of the vehicle.

5. The method of claim 1,
wherein the personal mobile device includes an operating system comprising operating-system instructions that are stored on a data storage of the personal mobile device and that, when executed by a processor of the personal mobile device, cause the personal mobile device to execute the operating system,
wherein usage of the application comprises usage detected by the operating system while the application is in a foreground of a shell of the operating system, and
wherein the application-usage data comprises application-usage data that is generated by the operating system and that reflects the usage of the application detected by the operating system while the application is in the foreground of the shell.

6. The method of claim 5, wherein the application-usage data generated by the operating system comprises at least one of a log file generated by the operating system and a screenshot of a display device of the personal mobile device as captured by the operating system.

7. The method of claim 1,
wherein the personal mobile device includes an operating system comprising operating-system instructions that are stored on a data storage of the personal mobile device and that, when executed by a processor of the personal mobile device, cause the personal mobile device to execute the operating system,
wherein usage of the application comprises at least one of:
usage detected by the application based on data that is received by the application from the operating system while the application is in a foreground of a shell of the operating system, and
usage detected by the application based on data that is received by the application from the operating system while the application is in a background of the operating system, and
wherein the application-usage data comprises application-usage data that is generated by the application and that reflects the usage of the application as detected by the application.

8. The method of claim 7, wherein the application-usage data generated by the application comprises at least one of a log file generated by the application, a screenshot of a display device of the personal mobile device as captured by the application, and a screenshot of the application as captured by the application.

9. The method of claim 1, wherein the application-usage data reflecting usage of the application comprises data reflecting at least one of:
an amount of time that the application was displayed by the personal mobile device via a display device of the personal mobile device,
a number of times that the application was displayed by the personal mobile device via the display device of the personal mobile device,
an amount of time that the vehicle operator interacted with the application,
a number of times that the vehicle operator interacted with the application,
a number of times that the application was launched on the personal mobile device by the vehicle operator, and
a number of times that the application was brought to a foreground of a shell of an operating system of the personal mobile device.

10. The method of claim 1, wherein obtaining the application-usage data from the personal mobile device of the vehicle operator comprises at least one of:
the vehicle obtaining the application-usage data from the personal mobile device via a local communication link between the vehicle and the personal mobile device,
a server computer obtaining the application-usage data from the personal mobile device over a network via respective communication links between the server computer and the network and between the network and the personal mobile device, and
the vehicle obtaining the application-usage data from the personal mobile device over the network via respective communication links between the vehicle and the network and between the network and the personal mobile device.

11. The method of claim 1, wherein the vehicle feature comprises vehicle-feature instructions that are stored on a data storage of the vehicle and that, when executed by a processor of the vehicle, cause the vehicle to provide the vehicle functionality.

12. The method of claim 1, wherein at least one of (i) the application functionality provided by the application on the personal mobile device and (ii) the vehicle functionality provided by the vehicle comprises one or more of: mapping, navigation, media playback, text messaging, telephony, and data tethering.

13. The method of claim 1, wherein identifying the vehicle feature of the vehicle that provides the vehicle functionality similar to the application functionality provided by the application on the personal mobile device, comprises:
determining the application functionality;
identifying, from among respective vehicle functionalities provided by one or more vehicle features, a vehicle functionality similar to the determined application functionality; and
obtaining a feature identification of the vehicle feature that provides the identified vehicle functionality.

14. The method of claim 13, wherein determining the application functionality comprises obtaining an application identification of the application on the personal mobile device and determining the application functionality based on the obtained application identification.

15. The method of claim 1, wherein determining the usage preference comprises at least one of:
generating a report indicating the usage preference and presenting the generated report via a user interface, and
removing the identified vehicle feature from the vehicle in response to determining the usage preference.

16. A computing device comprising:
a processor; and
a non-transitory computer-readable storage medium comprising instructions that, when executed by the processor, cause the computing device to:
obtain application-usage data from a personal mobile device of a vehicle operator of a vehicle, the application-usage data reflecting a usage, during operation of the vehicle, of an application on the personal mobile device;
identify a vehicle feature, of the vehicle, that provides a vehicle functionality similar to an application functionality provided by the application on the personal mobile device;
perform a comparison of the obtained application-usage data with feature-usage data, the feature-usage data reflecting a usage, during operation of the vehicle, of the identified vehicle feature;
determine, based on the comparison, a usage preference for using the application on the personal mobile device, during operation of the vehicle, over the identified vehicle feature, wherein the identified vehicle feature is implemented by a vehicle application installed on and executed by the vehicle to enable the vehicle functionality similar to the application functionality provided by the application on the personal mobile device; and
in response to determining that the usage preference is a preference for using the application on the personal mobile device over the identified vehicle feature, cause the vehicle to automatically uninstall the vehicle application installed on a memory component of the vehicle such that the vehicle application is removed from the memory component of the vehicle.

17. The computing device of claim 16,
wherein usage of the application comprises usage detected by an operating system, executed by the personal mobile device, while the application is in a foreground of a shell of the operating system, and wherein the application-usage data comprises application-usage data that is generated by the operating system and that reflects the usage of the application detected by the operating system while the application is in the foreground of the shell.

18. The computing device of claim 16,
wherein usage of the application comprises at least one of:
usage detected by the application based on data that is received by the application from an operating system, executed by the personal mobile device, while the application is in a foreground of a shell of the operating system, and
usage detected by the application based on data that is received by the application from the operating system while the application is in a background of the operating system, and
wherein the application-usage data comprises application-usage data that is generated by the application and that reflects the usage of the application as detected by the application.

19. The computing device of claim 16, wherein the application-usage data reflecting usage of the application comprises data reflecting at least one of:
an amount of time that the application was displayed by the personal mobile device via a display device of the personal mobile device,
a number of times that the application was displayed by the personal mobile device via the display device of the personal mobile device,
an amount of time that the vehicle operator interacted with the application,
a number of times that the vehicle operator interacted with the application,
a number of times that the application was launched on the personal mobile device by the vehicle operator, and
a number of times that the application was brought to a foreground of a shell of an operating system of the personal mobile device.

20. A method comprising:
obtaining application-usage data from a personal mobile device of a vehicle operator of a vehicle, the application-usage data reflecting a usage, during operation of the vehicle, of a mobile-device application executed by the personal mobile device;
identifying a vehicle application, executed by the vehicle, that provides a vehicle functionality similar to an application functionality provided by the mobile-device application executed by the personal mobile device;
performing a comparison of the obtained application-usage data with feature-usage data, the feature-usage data reflecting a usage, during operation of the vehicle, of the identified vehicle application;
determining, based on the comparison, a usage preference for using the mobile-device application on the personal mobile device, during operation of the vehicle, over the identified vehicle application, wherein the identified vehicle application is installed on and executed by the vehicle to enable the vehicle functionality similar to the application functionality provided by the mobile-device application on the personal mobile device; and
in response to determining that the usage preference is a preference for using the mobile-device application on the personal mobile device over the identified vehicle application feature, causing the vehicle to automatically uninstall the identified vehicle application installed on a memory component of the vehicle such that the identified vehicle application is removed from the memory component of the vehicle.

* * * * *

UNITED STATES PATENT AND TRADEMARK OFFICE
CERTIFICATE OF CORRECTION

PATENT NO. : 11,536,581 B2
APPLICATION NO. : 16/599557
DATED : December 27, 2022
INVENTOR(S) : Clinton Williams It is certified that error appears in the above-identified patent and that said Letters Patent is hereby corrected as shown below:

In the Claims

In Column 18, Line(s) 30, Claim 20, after "application", delete "feature".

Signed and Sealed this
Twenty-first Day of February, 2023

Katherine Kelly Vidal
*Director of the United States Patent and Trademark Office*